Feb. 4, 1969   W. A. STEWART   3,425,610
VACUUM DEVICE FOR ADVANCING A CONTINUOUS WEB
Filed June 29, 1966
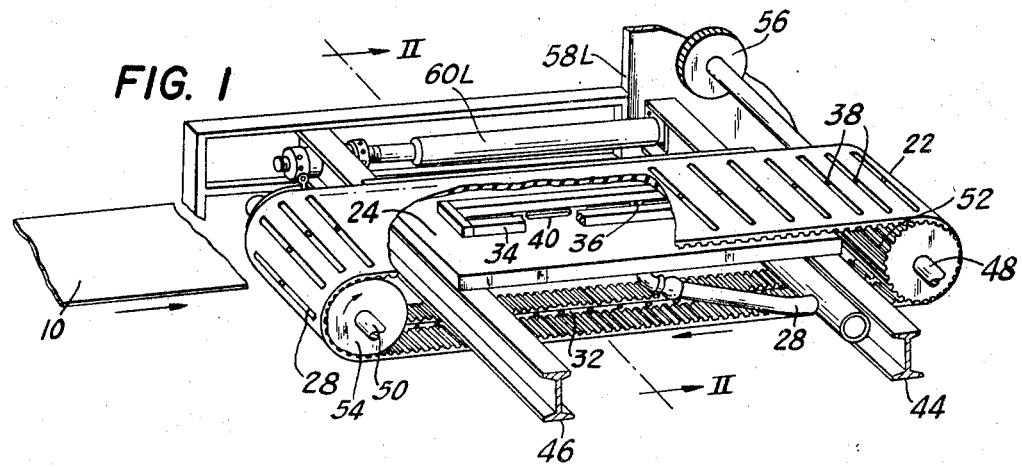
FIG. 1
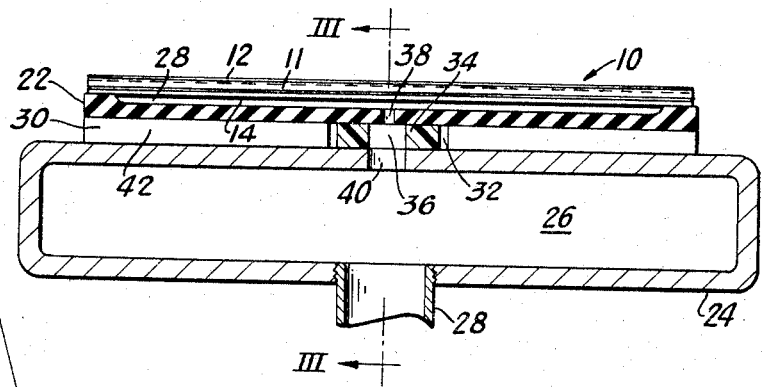
FIG. 2
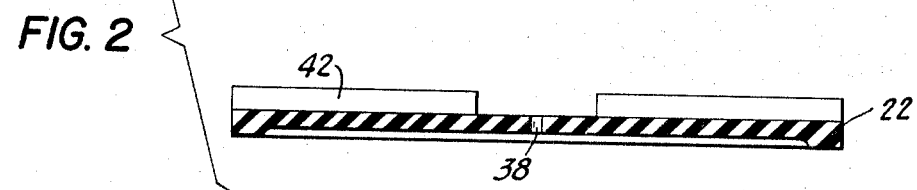
FIG. 3
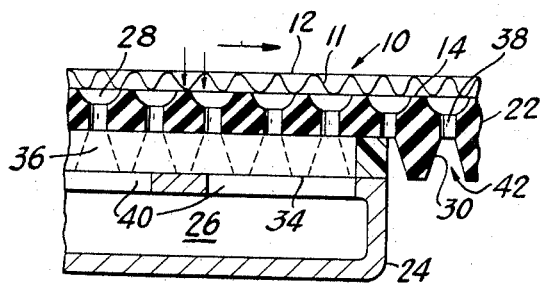
INVENTOR.
WARREN A. STEWART
BY Boyce C. Dent
his Attorney

United States Patent Office 3,425,610
Patented Feb. 4, 1969

3,425,610
VACUUM DEVICE FOR ADVANCING A CONTINUOUS WEB
Warren A. Stewart, Monkton, Md., assignor to Koppers Company, Inc., a corporation of Delaware
Filed June 29, 1966, Ser. No. 561,460
U.S. Cl. 226—95 2 Claims
Int. Cl. B65h 17/28, 17/34, 29/32

ABSTRACT OF THE DISCLOSURE

A pressure-balanced vacuum belt assembly for advancing a continuous web, such as paperboard, comprising an endless toothed belt surrounding a pair of spaced, toothed and driven pulleys and a vacuum chamber supporting the upper run of the belt between the pulleys. The belt includes a narrow circumferential slot in the lateral center thereof whose depth extends to the root face of the teeth; a plurality of radial holes extending through the belt from the bottom of the slot to the outer face; and a network of grooves in the outer face of the belt extending laterally from the holes but terminating short of the edges of the belt. The vacuum chamber includes a pair of anti-friction slides positioned within the belt slot on either side of the radial holes. Atmospheric pressure fills the spaces between the teeth as far as the anti-friction slides and thereby counteracts the atmospheric pressure bearing against the top of the belt, through the web, to provide a pressure-balanced vacuum belt assembly.

---

This invention relates generally to the manufacture of corrugated paperboard and, more particularly, to a device for applying a pulling force to a corrugated web to advance the web through a glue curing operation.

As pointed out in my Patent No. 3,140,030, corrugated paperboard is cured in a glue section called a "doublebacker." The web of paper is drawn through a hot section having a series of heated platens with the web pressed against them by a weighted continuous belt resting against the top surface of the web. The web is drawn through the hot section by a vacuum pulling section which is lineally adjacent to the hot section.

An ordinary vacuum belt wherein a perforated belt is supported by a vacuum box between two pulleys is not feasible in such applications for the reason that a vacuum of 3–6 inches of mercury (equivalent to 1½–3 p.s.i. pressure pressing the web to the belt) is required to advance the web through the double-backer. Under such conditions, the area of the vacuum belt required in contact with the web is about 50 square feet. Accordingly, about 21,600 pounds total pressure (3×50×144) exists, forcing the belt against the support. At the preferred 600 feet per minute surface speed of the belt, the heat generated from friction burns up the belt in a matter of minutes at most. Thus, if a vacuum belt is to be utilized, it becomes imperative to counteract the force pressing the belt against the support. When this force is counteracted, the belt is referred to as being "pressure balanced." When pressure balanced, the only frictional drag between the belt and the support is that caused by the weight of the belt itself and the web lying on top of the belt, and this friction is slight and does not cause undue wear of the belt. The pressure balancing arrangement described in my aforesaid Patent No. 3,140,030 involves the use of a double belt assembly.

Although machines made in accordance with my prior invention have proved to be valuable in the trade, they have certain disadvantages. For example, a double belt arrangement is expensive. If the inner belt fails, the belt tends to wrap around the pulleys of the outer belt which can destroy the whole assembly. In addition, some leakage of vacuum occurs between the surfaces where the inner belt is in lineal contact with the outer belt, as it is almost impossible to maintain a truly flat inner periphery of the outer belt to rest against the inner belt; the edges of the outer belt tend to curl up so that atmospheric pressure leaks in between the two belts.

The present invention provides improved means for pressure balancing a vacuum belt assembly that involves the use of a single belt. The invention generally comprises providing a pair of spaced apart pulleys encircled by a continuous belt having teeth on its inner periphery which mesh with and are driven by one of the pulleys having corresponding teeth; providing a support for the portion of the belt opposite the belt face portion in advancing engagement with the web; providing a pair of laterally spaced apart anti-friction slides on the top surface of the support and nested in a groove provided in the inner periphery of the belt; providing a network of grooves in the outer face of the belt in communication with a vacuum chamber in the support; and providing means for introducing atmospheric pressure between the inner periphery of the belt and the support to counteract the effect of atmospheric pressure forcing the belt against the support.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike:
FIGURE 1 is an isometric view of an embodiment of the present invention with portions broken away;
FIGURE 2 is a partial cross-section taken along the line II—II of FIGURE 1 showing the manner in which atmospheric pressure is utilized to achieve pressure balancing; and
FIGURE 3 is a cross-section taken along the lines III—III of FIGURE 2 showing the manner in which atmospheric pressure is utilized to avoid crushing of the web.

Referring now to FIGURE 1, a conventional web 10 is being drawn through a double-backer. Web 10, referring to FIGURE 3, is comprised of a corrugated medium 11 sandwiched between an upper liner 12 and a lower liner 14. Applying a vacuum to a network of grooves 20, in the upper face of vacuum belt 22 will result in atmospheric pressure forcing web 10 against vacuum belt 22. Furthermore, atmospheric pressure is free to enter the flutes of the corrugated web from both edges of the web, the flutes lying laterally of the direction of web travel. Thus, atmospheric pressure reacts only against the lower liner and a portion of the tips of the flutes of the corrugated medium as indicated by the arrows. Obviously, crushing of the web is avoided since none other than normal air pressure reacts against the top of the web. Also the pulling force is applied to the lower liner only. Thus, there is no tendency for a differential pulling action to be applied unequally to the upper and lower liners as with conventional equipment to shear the liners apart.

The application of atmospheric pressure to hold the web against the vacuum belt having been shown above, it remains to be shown how to avoid having atmospheric pressure not only force the web against the belt but also force the belt against support 24. Ordinarily, the total force holding the web to the belt 22 would also equally force the belt against support 24. Referring now to FIGURE 2, support 24 is illustrated as being hollow so as to form a vacuum chamber 26 extending laterally across the width of web 10. A source of vacuum, such as a conventional vacuum pump or exhaust blower (not shown) is connected to chamber 26 such as by a threaded conduit 28. Vacuum belt 22 rests on top of support 24 as shown. A network of grooves 20 is provided in the outer periphery of belt 22. The network comprises a series of grooves 28, FIGURES 1 and 2, more or less evenly spaced around the belt, preferably about one inch apart in circumferential dimension. The ends of the grooves do not extend to the edge of the belt so that when the web is lying on top of the belt, the grooves are closed to atmosphere.

Belt 22 is provided with a number of equally spaced laterally extending cleats or teeth 30 around its inner periphery. The teeth are analogous to internal spur gear teeth. Such belts are conventional, commercially available, and no further description is deemed necessary insofar as the toothed configuration is concerned. A circumferential groove 32 is provided in the lateral center of the belt, with a depth extending to the root face of the teeth 30. A pair of antifriction slides 34 are secured to the top of support 24 extending lengthwise in the direction of web travel. They are spaced apart laterally so as to form a slot 36 between them. Preferably, there is a slight clearance between the outer surfaces of slides 34 and the inner ends of teeth 30 to prevent rubbing between the surfaces.

The slides 34 are preferably made from a filled polytetrafluoroethylene exhibiting good wear characteristics and low coefficient of friction. Other types of long wearing antifriction materials may be substituted with equal advantage. The slides may be secured by an adhesive or by screws (not shown) or in any other convenient manner. As shown in FIGURE 1, slot 36 is closed at its ends, preferably by using the same material as used for the slides. Thus, it can be seen that slot 36 is closed to atmosphere at the end of support 24.

Groove network 20 is placed in communication with vacuum chamber 26 by holes 38 provided in belt 22 opposite each lateral groove 28 of the network and by a series of elongated slots 40 in support 24. Slots 40 are of a size to correspond with the width of slot 36 formed by slides 34. Thus, it can be seen that there is a path of travel for air in the groove network to be exhausted through conduit 28 to cause atmospheric pressure on top of the web (as previously explained) to press the web against belt 22 to the degree that air is withdrawn from the grooves.

My prior Patent 3,140,030, as illustrated in FIGURES 3 and 4 of that patent, provided for a secondary endless belt with an upper run travelling linearly tangent to the inner periphery of the upper run of the toothed belt. In addition, the spaces 53 between teeth 34 were closed off by rims 52 to form spaces 53 closed to atmosphere in my prior patent. Atmosphere was withdrawn from those spaces so that the outer and inner belts were drawn together rather than having atmospheric pressure press the outer belt against the support. The result was analogous to placing a web over an inner tube with holes in its outer periphery, exhausting air from the inner tube and sliding it across a support. Substantial pressure balancing was achieved, the unbalanced area being opposite the slots 60 in belt 38 of my prior Patent 3,140,030.

Advantageously, the same beneficial results have been achieved in the present invention without the need for a complex dual belt assembly. To pressure balance the belt, as best illustrated in FIGURE 2, the spaces 42 between teeth 30 extend to the lateral edges of the belt 22 so as to be open to atmosphere. The placement of slides 34 closes the inner ends of the teeth so that atmosphere does not leak into the vacuum communication network. Thus, atmosphere in tooth spaces 42 reacts against the inner periphery of belt 22 and counteracts atmospheric pressure acting directly opposite on the outer surface of the belt through web 10. Slides 34 react against atmospheric pressure directly opposite their place of contact with belt 22. The area of belt 22 opposite groove 36 is unsupported and is actually the only area of unbalance in the whole assembly. Since there is no contact with the support in this area, no frictional drag is created opposite slot 36. Thus, only the fractional area of contact between the belt 22 and slides 34 creates any frictional drag between the belt and support due to atmospheric pressure opposite slot 36. There is, of course, an inconsequential frictional drag between the outer tooth faces and the support but only to the degree created by the weight of the belt.

The foregoing arrangement is very practically arranged to provide the useful machine illustrated in FIGURE 1. A pair of supports 44 and 46 are spaced apart as shown and extend laterally beyond the width of web 10. These supports carry laterally extending shafts 48 and 50 respectively upon which are mounted pulleys 52 and 54. Pulley 52 is provided with external spur gear teeth for meshing engagement with teeth 30 of belt 22. Pulley 52 is secured to shaft 48 for rotation therewith, the shaft being driven by a gear 56 secured to one end, which gear is usually meshed with another gear on a line shaft (not shown). Pulley 54 is preferably smooth surfaced, the belt teeth merely resting against the surface. If desired, this pulley may also be toothed in a manner similar to pulley 52. Support 24 is mounted so that its ends are respectively secured on top of supports 44 and 46, the geometry being such that the arrangement described in FIGURE 3 is achieved. Conduit 28 is secured to support 24 and is connected to a vacuum source (not shown) which is driven at constant speed since the amount of vacuum required is independent of web speed.

Support 44 is preferably fixed to right and left standards, only standard 58L being shown. Support 46 is preferably guided in these standards so as to be movable away from support 44. By providing conventional jackshafts, the left hand jackshaft 60L being shown, between supports 44 and 46, the supports are adjustably spaced from one another. This feature permits simpler installation of belt 22 around pulleys 52 and 54. Furthermore, should belt 22 stretch after break-in, the jackshafts can be used to properly tension the belt.

The web 10 is normally made in widths up to 87 inches and occasionally wider. A single belt 22 having such width may be used. However, a plurality of narrower belts in lateral relationship may be used, each belt assembly being similar to the one described. When small belts are employed, a small space, about ⅝ inch, is usually left between each pair.

From the foregoing description, it can be seen that a simple inexpensive arrangement has been provided that will advance a web through a double-backer. With vacuum applied and the pulley 52 driven, the web 10 will positively adhere to belt 22 and be advanced as belt 22 is rotated. A simple and effective means is provided for pressure balancing the belt so that more than 20,000 pounds total force can be utilized for adhering the web to the belt without fear of crushing the web.

What is claimed is:

1. Apparatus for advancing a continuous web comprising:

a continuous belt having an upper run engageable with said web for advancing said web, a plurality of transverse grooves extending almost to the sides of said belt, a pair of spaced apart pulleys encircled by said belt for driving said belt, a support between said pulleys and upon which the upper run of the belt rests, anti-friction means of substantially less width than said belt and secured to said support and in engagement with said belt along the length of said support, vacuum means operative through said anti-friction means for applying a vacuum to said grooves whereby the vacuum holds the web to the belt, and pressure balance means between said support and said belt and between said anti-friction means and the edge of the belt for exposing the portion of said belt resting on said support to atmospheric pressure whereby the force due to the atmosphere pressing the web against the belt is not transferred to the support, said pressure balance means comprising:
providing one pulley of said pair of spaced apart pulleys with a toothed outer periphery; and providing said continuous belt with a toothed inner periphery adapted for driving engagement by said toothed pulley, the top land of the teeth of said belt being in sliding contact with said support thereby providing a path for atmospheric pressure in the openings defined by the faces of adjacent teeth, the bottom land between adjacent teeth, and said support.

2. The apparatus of claim 1 wherein said anti-friction means comprises a pair of polytetrafluoroethylene slides positioned on the top surface of said support in the direction of web travel and spaced apart along the center portion of said support thus providing a groove, and which said air is evacuated from said portion of the network of grooves in contact with said web to said vacuum chamber, said slides nesting in a continuous groove provided in the inner periphery of said belt for guiding said belt in a circulinear path and to provide an area of reduced friction between said belt and said support adjacent the unbalanced portion of said belt.

References Cited

UNITED STATES PATENTS

| 3,140,030 | 7/1964 | Stewart | 226—95 |
| 3,198,517 | 8/1965 | Martin | 271—74 |

FOREIGN PATENTS

| 713,529 | 11/1941 | Germany. |

ALLEN N. KNOWLES, *Primary Examiner.*

U.S. Cl. X.R.

226—170; 271—74